United States Patent Office 3,655,756
Patented Apr. 11, 1972

3,655,756
BENZENESULFONYL UREAS HAVING HYPOGLYCEMIC ACTIVITY
Helmut Weber and Rudi Weyer, Frankfurt am Main, Walter Aumuller and Karl Muth, Kelkheim, Taunus, and Kurt Stach, Mannheim, Germany, assignors to Farbwerke Hoechst Aktiengesellschaft vormals Meister Lucius & Bruning, Frankfurt am Main, Germany
No Drawing. Continuation-in-part of applications Ser. No. 511,990, Dec. 6, 1965, and Ser. No. 636,290, May 5, 1967. This application Feb. 14, 1969, Ser. No. 799,534
Claims priority, application Germany, Dec. 8, 1964, F 44,630
Int. Cl. C07c 127/00
U.S. Cl. 260—553 D 16 Claims

ABSTRACT OF THE DISCLOSURE

Benzenesulfonyl urea compounds that are effective as oral antidiabetic agents are disclosed to have the formula $$\underset{X_1}{\overset{X}{\diagdown}}N-\underset{\underset{O}{\|}}{C}-NH-Y-\!\!\!\!\bigcirc\!\!\!\!-SO_2-NH-CO-NH-R$$

wherein
R is
  (a) alkyl or alkenyl of 3–6 carbon atoms,
  (b) endoalkylene-cyclohexyl, endoalkylene - cyclohexenyl, endoalkylene-cyclohexylmethyl or endoalkylene-cyclohexenylmethyl of 1–2 endoalkylene carbon atoms,
  (c) benzyl, phenylethyl,
  (d) cyclohexyl methyl,
  (e) lower alkyl cyclohexyl or dialkyl cyclohexyl methyl cyclopentyl,
  (f) cycloalkyl of 5–8 carbon atoms in the ring
  (g) cyclohexenyl, cyclohexenyl-methyl, methylcyclohexenyl, or
  (h) nortricyclyl,
X is
  (a) phenyl, trifluoromethyl phenyl, phenyl substituted by one to two substituents selected from the group consisting of halogen, lower alkyl and lower alkoxy, or
  (b) benzyl,
$X_1$ is alkyl of 1 to 3 carbon atoms, and
Y is a saturated hydrocarbon of 1 to 3 carbon atoms.

This application is a continuation-in-part of our copending application Ser. No. 511,990 filed on Dec. 6, 1965, and Ser. No. 636,290 filed May 5, 1967, both of which are now abandoned.
The present invention provides benzenesulfonyl-ureas corresponding to the general formula $$\underset{X_1}{\overset{X}{\diagdown}}N-\underset{\underset{O}{\|}}{C}-N-Y-\!\!\!\!\bigcirc\!\!\!\!-SO_2-NH-CO-NH-R$$

as well as salts of said benzenesulfonyl-ureas. In the formula
R stands for:
  (a) alkyl or alkenyl of 3 to 6 carbon atoms,
  (b) benzyl, phenylethyl,
  (c) cyclohexylmethyl,
  (d) endoalkylene-cyclohexyl, endoalkylene - cyclohexenyl, endoalkylene-cyclohexylmethyl or endoalkylene-cyclohexenylmethyl of 1–2 endoalkylene carbon atoms,
  (e) lower alkylcyclohexyl, lower dialkylcyclohexyl, methyl cyclopentyl,
  (f) cycloalkyl of 5 to 8 carbon atoms,
  (g) cyclohexenyl, cyclohexenyl - methyl, methyl cyclohexenyl,
  (h) nortricyclyl,
Y represents a saturated hydrocarbon chain containing 1–3 carbon atoms,
X is
  (a) phenyl, trifluoromethyl phenyl, nitrophenyl, methylenedioxyphenyl, phenyl substituted by one to two substituents selected from the group consisting of halogen, lower alkyl and lower alkoxy, or
  (b) benzyl and
$X_1$ is alkyl of 1 to 3 carbon atoms.

In the foregoing and the following definitions "lower alkyl" in every case stands for an alkyl group containing 1–4 carbon atoms in straight or ramified chain.
According to the above-mentioned definitions R may represent, for instance, propyl, isopropyl, butyl, isobutyl, sec. butyl, straight-chained or ramified amyl (pentyl) or hexyl as well as the radicals corresponding to said hydrocarbon radicals and containing an ethylenic double linkage such, for instance, as allyl or crotyl. Furthermore, there are appropriate as R benzyl, α-phenylethyl or β-phenylethyl.
Within the scope of the invention there are particularly preferred compounds containing as R a cycloaliphatic hydrocarbon radical which may be substituted by alkyl or linked to the nitrogen atom by means of alkylene. Said radicals comprise, for instance, cyclopentyl, cyclohexyl, cycloheptyl, cyclooctyl, methyl cyclopentyl, methylcyclohexyl, ethyl-cyclohexyl, propyl-, and isopropylcyclohexyl. The alkyl groups can be present in the cyclohexyl ring preferably in 4-position to the sulfonyl-urea substituent and may take there the cis- as well as the trans-position. Furthermore, there are mentioned: Endomethylene-cyclohexyl (2,2,-bicycloheptyl), endoethylene-cyclohexyl (2,2,2-bicyclooctyl), endomethylencyclohexenyl, endoethylenecyclohexenyl, endomethylenecyclohexenylmethyl or endoethylene-cyclohexenylmethyl, endomethylene - cyclohexylmethyl, endoethylene - cyclohexylmethyl.
The grouping $$\underset{X_1}{\overset{X}{\diagdown}}N-$$

means for example, indolino, tetrahydro quinolino, furthermore groupings of the following formulae

[structures: phenyl-N(CH₃)—, phenyl-N(C₂H₅)—, phenyl-N(C₃H₇)—,
phenyl-N(C₃H₇(i))—, CH₃-phenyl-N(CH₃)—, CH₃-phenyl-N(CH₃)—,
CH₃-phenyl-N(CH₃)—, Cl-phenyl-N(CH₃)—, Cl-phenyl-N(CH₃)—,
Cl-phenyl-N(CH₃)—, CH₃O-phenyl-N(CH₃)—, C₂HO-phenyl-N(CH₃)—,
OC₃H₇-phenyl-N(CH₃)—, CF₃-phenyl-N(CH₃)—, O₂N-phenyl-N(CH₃)—]

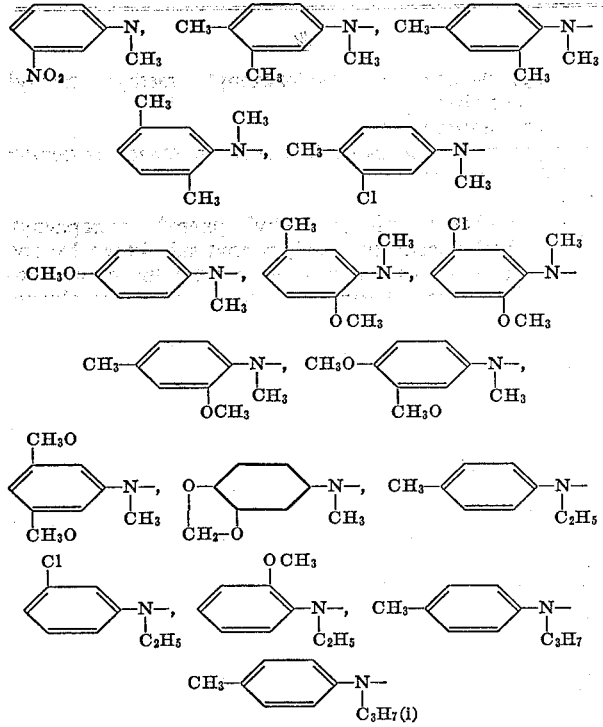

Y may represent, for example, a saturated hydrocarbon radical of 1–3 carbon atoms in straight chain or branched, such as:

—CH$_2$CH$_2$—,  —CH(CH$_3$)—CH$_2$—,
—CH$_2$—CH(CH$_3$)—

The mentioned benzenesulfonyl-ureas may be prepared according to various methods which are generally used for the preparation of compounds of this kind. Thus amines of the formula R—NH$_2$ or, if desired their salts can be reacted with benzenesulfonyl isocyanates, benzenesulfonyl carbamic acid esters, benzenesulfonyl thiolcarbamic acid esters, benzenesulfonyl-ureas, benzenesulfonyl - semicarbazides or benzenesulfonyl-semicarbazones which are substituted by the group

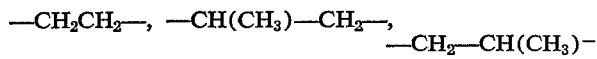

or benzenesulfonamides substituted by the group

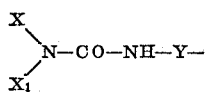

or their salts can be reacted with R-substituted isocyanates, carbamic acid esters, thiolcarbamic acid esters, carbamic acid halides or ureas or corresponding benzenesulfonyl-ureas containing in the molecule unsaturated compounds can be hydrogenated and the products obtained can be treated with alkaline agents if salt formation is desired.

According to the nature of X, X$_1$ and R, in some cases one or the other process, mentioned for the preparation of individual compounds according to the general formula, might be inappropriate. Such relatively rare cases can easily be realized by experts and it is not difficult to use successfully a method of synthesis other than that described.

The mentioned benzenesulfonyl-carbamic acid esters or the benzenesulfonyl thiolcarbamic acid esters may contain in the alcohol component an alkyl radical or an aryl radical or also a heterocyclic radical. Since this radical is split off in the reaction, its chemical constitution does not influence the nature of the final product and it may therefore be varied within wide limits.

The same applies to the R-substituted carbamic acid esters or the corresponding monothiol-carbamic acid esters.

As carbamic acid halides, the chlorides are particularly suitable.

The benzenesulfonyl-ureas to be used as starting substances in the process of the present invention may be unsubstituted at the side of the urea molecule opposite to the sulfonyl group or may be mono- or, in particular, di-substituted. Since these substituents are split off in the reaction with amines, their nature may be varied within wide limits. In addition to benzenesulfonylureas carrying alkyl-, aryl-, acyl- or heterocyclic substituents, there may also be used bis-(benzene-sulfonyl)-ureas which may carry, at one of the nitrogen atoms, an additional substituent, for example, methyl. For example, bis-(benzenesulfonyl)-ureas or also N-benzenesulfonyl-N'-acyl-ureas may be treated with amines of the formula R$^1$NH$_2$ and the salts obtained may be heated to elevated temperatures, in particular, those above 100° C.

Furthermore, it is possible to start from ureas of the formula H$_2$N—CO—NHR$^1$ or from ureas which may carry, at the free nitrogen atom, one or preferably two substitutents, and to react these with benzene sulfonamides carrying in 4-position the substituent

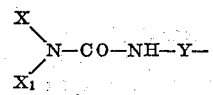

As such starting compounds, there may be mentioned for example the corresponding N'-acetyl-, N'-nitro-, N'-cyclohexyl-, N'-(4-methyl-cyclohexyl)-, N',N'-diphenyl- (wherein the two phenyl radicals may also carry substituents or may be linked to each other directly or over a bridge member such as —CH$_2$—, —NH—, —O— or —S—); N'-methyl-N'-phenyl-, N',N'-dicyclohexyl-ureas as well as R-substituted carbamoyl-imidazols or -triazols.

As regards the reaction conditions, the forms of realizing the processes may in general vary within wide limits and adapted to each individual case. For example, the reaction using solvents may be carried out at room temperature or at an elevated temperature.

The benzenesulfonyl-urea-derivatives, obtainable according to the present invention are valuable new remedies which are distinguished by a strong and long lasting blood sugar lowering action. The blood sugar lowering action can be determined for example at rabbits by feeding them the products of the present invention in a dose of 10 milligrams/kilograms, and measuring over a prolonged period of time, according to the known method of Hagedorn-Jensen or with an autoanalyzer, the blood sugar level. Thus, it was found, that N-[4-(β-indolinocarbonamido-ethyl)-benzenesulfonyl] - N' - (4 - methyl-cyclohexyl)-urea in a rabbit provokes a lowering of the blood sugar of 32%, which after 24 hours still amounts to 29% and after 48 hours still 13%. The N-[4-(β-indolinocarbonamidoethyl)-benzenesulfonyl] - N' - cyclohexylurea causes under given test conditions even a lowering of the blood sugar of 38% which, after 24 hours still amounts to 20%.

Furthermore, it has been found, that N-[4-(β-<N-methyl-N-phenyl - ureido>-ethyl) - benzenesulfonyl]-N'-(4-methyl-cyclohexyl)urea in a rabbit provokes after 3 hours a lowering of the blood sugar of 30%, which after 24 hours still amounts to 49%. The N-[4-(β-<N-4-methyl-phenyl - N - methyl-ureido>-ethyl)-benzenesulfonyl]-N'-(4-methyl-cyclohexyl)-urea causes after 6 hours under given test conditions a lowering of the blood sugar of 32%, which after 24 hours still amounts to 27% and after 48 hours still 25%. The N-[4-(β-<2-chlorphenyl-N-methyl-ureido>ethyl)-benzensulfonyl] - N' - cyclohexyl-urea likewise causes after 3 hours a lowering of the blood sugar of 30% which after 24 hours still amounts to 39%.

Corersponding values have been found with other compounds of this class as shown by the following table:

| Compound: | Blood sugar lowering in rabbits after oral application of 10 mg./kg. (percent) |
|---|---|
| N-[4 - (β - indolino - carbamidoethyl)-benzenesulfonyl]-N'-(4-methyl-cyclohexyl)-urea | 20 |
| N-[4 - (β - <N - 4 - Methylphenyl - N - methylureido>-ethyl) - benzenesulfonyl] - N' - (4-methyl-cyclohexyl)-urea | 20 |
| N-[4 - (β-<N - 3 - Methylphenyl - N - methylureido>-ethyl) - benzenesulfonyl] - N' - (4-methyl-cyclohexyl)-urea | 26 |
| N-[4 - (β-<N - 4 - Methoxyphenyl - N - methylureido>-ethyl)-benzenesulfonyl] - N' - cyclohexyl-urea | 25 |
| N-[4 - (β - <N - 3 - Trifluoromethylphenyl-N-methyl-ureido>-ethyl) - benzenesulfonyl]-N'-(4-methylcyclohexyl)-urea | 31 |
| N-[4 - (β-<N - 3 - Methoxyphenyl - N - methylureido>-ethyl) - benzenesulfonyl] - N' - (4-methylcyclohexyl)-urea | 26 |
| N-[4 - (β - <2 - Chlorophenyl - N' - methylureido>-ethyl)-benzenesulfonyl] - N' - cyclohexyl-urea | 30 |

In contrast to this, the N-(4-methyl-benzenesulfonyl)-N'-butyl-urea which has been known as antidiabetic for oral administration when used in doses of less than 25 milligrams/kilogram remains without effect.

The benzenesulfonyl-ureas described are preferably used for the manufacture of orally applicable preparations for the lowering of the blood sugar level in the treatment of diabetes mellitus and may be used as such or in the form of their physiologically tolerable salts or in the presence of substances which cause such salt formation. For the formation of salts, there may be used alkaline agents, such, for example, as alkali metal hydroxides or alkaline earth metal hydroxides, alkali metal or alkaline earth metal, carbonates or bicarbonates, furthermore, ammonia or physiologically compatible organic nitrogen bases such as ethanolamine, di- and triethanolamine, said alkaline agents and bases being commonly used in the pharmaceutical industry to form physiologically tolerable salts.

The pharmaceutical preparations are preferably in the form of tablets containing, in addition to the compounds of the invention, the usual adjuvants and carriers such as talc, starch, lactose, tragacanth or magnesium stearate.

A pharmaceutical preparation containing one of the aforesaid benzenesulfonyl-urea as active substance, for example, a tablet or a powder, with or without the aforesaid carriers is advantageously brought into a suitable unit dosage form. The dose chosen should comply with the activity of the benzenesulfonyl-urea used and the desired effect. Advantageously, the dosage per unit amounts to about 0.5 to 100 milligrams, preferably 2 to 10 milligrams, but considerably higher or lower dosage units may also be used, which, if desired, are divided or multiplied prior to their administration.

The following examples serve to illustrate the invention, but they are not intended to limit it thereto.

EXAMPLE 1

N-[4-(β-indolino-carbamidoethyl)-benzenesulfonyl]-N'-cyclohexylurea 17.2 g. 4 - (β - indolinocarbamidoethyl) - benzenesulfonamide (melting point 189–191° C., prepared from 4 - (β - aminoethyl) - benzenesulfonamide and indolinocarboxylic acid chloride) are suspended in 200 ml. of acetone and dissolved in water with a solution of 2 g. of sodium hydroxide. To this solution 6.5 g. cyclohexylisocyanate are added dropwise while stirring at room temperature and stirring is continued for 2 hours. The mixture is then diluted with water, filtered, and the filtrate is acidified with dilute hydrochloric acid. The precipitating N - [4 - (β - indolino - carbamidoethyl) - benzenesulfonyl]-N'-cyclohexyl-urea is reprecipitated from 1% of ammonia and recrystallized from water/ethanol. Melting point 200–202° C. In analogous manner there is obtained:

N-[4-(β-indolino-carmabidoethyl)-benzenesulfonyl]-N'-(4-methylcyclohexyl)-urea, melting point 184–186° C., N-[4-(β-indolino-carbamidoethyl)-benzenesulfonyl](N'-butyl-urea, melting point 193–195° C., N-[4-(β-indolino-carbamidoethyl)-benzenesulfonyl]-N'-(4-ethylcyclohexyl)-urea, melting point 179–181° C., N-[4-(β-indolino-carbamidoethyl)-benzenesulfonyl]-N'-(2,5-endomethylene-cyclohexylmethyl)-urea, melting point 174–176° C.

Furthermore it has been prepared in analogous manner:

N - [4 - (γ - indolinocarbonamidopropyl) - benzenesulfonyl]-N'-cyclohexylurea, melting point 155° C. (from methanol (water) from 4-(γ-indolinocarbonamidopropyl)-benzenesulfonamide (melting point 161° C.), N - [4 - (β - indolinocarbonamidopropyl) - benzenesulfonyl]-N'-cyclohexylurea, melting point 174° C. (from methanol/water), from 4 - (β - indolinocarbonamidopropyl)-benzenesulfonamide (melting point 171° C.), N - [4 - (β - <1,2,3,4 - tetrahydro - quinolino - carbamido> - ethyl) - benzenesulfonyl] - N' - cyclohexylurea, melting point 184–186° C. from the 4-(β-<1,2,3,4 - tetrahydro - quinolino - carbamido> - ethyl)-benzene-sulfonamide, melting point 138–139° C., N-[4-(β-<1,2,3,4-tetrahydro-quinolino-carbamido>-ethyl)-benzene-sulfonyl]-N'-butyl-urea, melting point 135–137° C., N-[4-(β-<1,2,3,4-tetrahydro-kuinolino-carbamido>-ethyl)-benzenesulfonyl]-N'-(4-methyl-cyclohexyl)-urea, melting point 153–155° C., N-[4-(β-<N-benzyl-N-methyl-ureido>-ethyl)-benzenesulfonyl]-N'-propyl-urea, melting point 142–144° C., N-[4-(β-<N-benzyl-N-methyl-ureido>-ethyl)-benzenesulfonyl]-N'-hexyl-urea, melting point 98–101° C., N-[4-(β-<N-benzyl-N-methyl-ureido>-ethyl)-benzenesulfonyl]-N'-benzyl-urea, melting point 157–159° C., N-[4-(β-<N-benzyl-N-methyl-ureido>-ethyl)-benzenesulfonyl]-N'-cyclohexylmethyl)-urea, melting point 167–169° C., N-[4-(β-<N-benzyl-N-methyl ureido>-ethyl)-benzenesulfonyl]-N'-(Δ3-cyclohexenylmethyl)-urea, melting point 160–162° C., N-[4-(β-<N-4-methoxyphenyl-N-methyl-ureido>-ethyl)-benzenesulfonyl]-N'-(4-isopropyl-cyclohexyl)-urea, melting point 206–208° C., N-[4-(β-<N-4-ethoxy-phenyl-N-methyl-ureido>-ethyl)-benzenesulfonyl]-N'-(4-tert.-butyl-cyclohexyl)-urea, melting point 154–156° C., N-[4-(β-<N-3-methoxyphenyl-N-methyl-ureido>-ethyl)-benzenesulfonyl]-N'-(4-methyl-Δ3-cyclohexenyl)-urea, melting point 130–132° C., N-[4-(β-<N-4-chlorophenyl-N-methyl-ureido>-ethyl)-benzenesulfonyl]-N'-(2,5-endomethylene-Δ3-cyclohexenyl)-urea, melting point 199–201° C., N-[4-(β-<N-4-methyl-phenyl-N-methyl-ureido>-ethyl)-benzenesulfonyl]-N'-(β-phenylethyl)-urea, melting point 170–172° C., N-[4-(β-<N-4-methylphenyl-N-methyl-ureido>-ethyl)-benzenesulfonyl]-N'-cyclooctyl-urea, melting point 134–137° C., N-[4-(β-<N-4-methylphenyl-N-methyl-ureido>-ethyl)-benzenesulfonyl]-N'-allyl-urea, melting point 178–180° C., N-[4-(β-<N-4-methylphenyl-N-methyl-ureido>-ethyl)-benzenesulfonyl]-N'-(3-methyl-cyclopentyl)-urea, melting point 153–155° C.,

EXAMPLE 2

N-[4-(β-N-phenyl-N-methyl-ureido-ethyl)-benzene-sulfonyl]-N'-cyclohexyl-urea 8.3 g. 4-(β-<N-phenyIN-methyl-ureido>ethyl)-benzenesulfonamide (melting point 156–158° C., prepared by reaction of 4-(β-aminoethyl)-benzenesulfonamide with N-phenyl-N-methyl-carbamic acid chloride) are suspended in 100 ml. acetone and dissolved by addition of 1 g. NaOH and water. To this solution 3.3 g. cyclohexylisocyanate are added dropwise while stirring at room temperature and stirring is continued for 2 hours. Water is added to the reaction mixture, then it is filtered, and acidified with hydrochloric acid. The precipitating product is filtered off with suction, it is reprecipitated from 1% of ammonia and N-[4-(β-<N-phenyl-N-methyl-uredio>-ethyl)-benzenesulfonyl]-N'-cyclohexyl-urea melting at 148–150° C. is obtained by recrystallization from water/ethanol.

In analogous manner there is obtained:

N-[4-(β-<N-phenyl-N-methyl-ureido>-ethyl)-benzenesulfonyl]-N'-(4-methyl-cyclohexyl)-urea, melting point 136–138° C.

N-[4-(β-<N-phenyl-N-methyl-ureido>-ethyl)-benzenesulfonyl]-N'-butyl-urea, melting point 131–133° C., from 4-(β-<N-2-chlorophenyl-N-methyl-ureido>-ethyl)-benzenesulfonamide, melting point 134–136°:

N-[4-(β-<N-2-chlorophenyl-N-methyl-ureido>-ethyl)-benzenesulfonyl]-N'-cyclohexyl-urea, melting point 204–206° C., N-[4-(β-<N-2-chlorophenyl-N-methyl-ureido>-ethyl)-benzenesulfonyl]-N'-(4-methyl-cyclohexyl)-urea, melting point 169–171° C., N-[4-(β-N<2-chlorophenyl-N-methyl-ureido>-ethyl)-benzenesulfonyl]-N'-isobutyl-urea, melting point 189–191° C., from 4-(β-<N-3-chlorophenyl-N-methyl-ureido>-ethyl)-benzenesulfonamide, melting point 158–160° C.:

N-[4-(β-<N-3-chlorophenyl-N-methyl-ureido>-ethyl)-benzenesulfonyl]-N'-cyclohexyl-urea, melting point 168–170° C., N-[4-(β-<N-3-chlorophenyl-N-methyl-ureido>-ethyl)-benzenesulfonyl]-N'-(4-methyl-cyclohexyl)-urea, melting point 150–152° C., from 4-(β-<N-4-chlorophenyl-N-methyl-ureido>-ethyl)-benzenesulfonamide, melting point 168–170° C.:

N-[4-(β-<N-4-chlorophenyl-N-methyl-ureido>-ethyl)-benzenesulfonyl]-N'-cyclohexyl-urea, melting point 173–175° C., N-[4-(β-<N-4-chlorophenyl-N-methyl-ureido>-ethyl)-benzenesulfonyl]-N'-(4-methyl-cyclohexyl)-urea, melting point 179–181° C., from 4-(β-<N-4-methylphenyl-N-methyl-ureido>-ethyl)-benzenesulfonamide, melting point 163–165° C.:

N-[4-(β-<N-4-methylphenyl-N-methyl-ureido>-ethyl)-benzenesulfonyl]-N'-cyclohexyl-urea, melting point 165–167° C., N-[4-(β-<N-4-methylphenyl-N-methyl-ureido>-ethyl)-benzenesulfonyl]-N'-(4-methylcyclohexyl)-urea, melting point 176–178° C., N-[4-(β-<N-4-methylphenyl-N-methyl-ureido>-ethyl)-benzenesulfonyl]-N'-(4-ethyl-cyclohexyl)-urea, melting point 163–165° C., N-[4-(β-<N-4-methylphenyl-N-methyl-ureido>-ethyl)-benzenesulfonyl]-N'-cycloheptyl-urea, melting point 140–142° C., N-[4-(β-<N-4-methylphenyl-N-methyl-ureido>-ethyl)-benzenesulfonyl]-N'-isobutyl-urea, melting point 137–139° C., N-[4-(β-<N-4-methylphenyl-N-methyl-ureido>-ethyl)-benzenesulfonyl]-N'-(4-methyl-Δ3-cyclohexenyl)-urea, melting point 178–180° C., N-[4-(β-<N-4-methylphenyl-N-methyl-ureido>-ethyl)-benzenesulfonyl]-N'-(Δ3-cyclohexenyl)-urea, melting point 150–152° C., from 4-(β-<N-3-methylphenyl-N-methyl-ureido>-ethyl)-benzenesulfonamide, melting point 136–138° C.:

N-[4-(β-<N-3-methylphenyl-N-methyl-ureido>-ethyl)-benzenesulfonyl]-N'-cyclohexyl-urea, melting point 167–169° C.

N - [4-(β-<N-3-methylphenyl-N-methyl-ureido>-ethyl)-benzenesulfonyl]-N'-(4-methyl-cyclohexyl)-urea, melting point 133–135° C., N - [4-(β-<N-3-methylphenyl-N-methyl-ureido>-ethyl)-benzenesulfonyl]-N'-isobutyl-urea,( melting point 150–152° C., from 4-(β-N-<2-methylphenyl-N-methyl-ureido>-ethyl)-benzenesulfonamide, melting point 138–140°C.:

N-[4-(β-<2-methylphenyl - N - methyl-ureido>-ethyl)-benzenesulfonyl] - N' - cyclohexyl-urea, melting point 197–199° C., N - [4-(β-N-<2-methylphenyl-N-methyl-ureido>-ethyl)-benzenesulfonyl]-N'-(4-methyl-cyclohexyl)-urea, melting 171–172° C., from 4-(β-<N-ethyl-N-phenyl-ureido>-ethyl)-benzenesulfonamide, melting point 138–140° C.:

N-[4-(β-<N - ethyl-N-phenyl-ureido>-ethyl)-benzenesulfonyl]-N'-cyclohexyl-urea, melting point 162–164° C., N-[4-(β-<N - ethyl-N-phenyl-ureido>-ethyl)-benzenesulfonyl] - N' - (4-methyl-cyclohexyl)-urea, melting point 159–161° C., N-[4-(β-<N - ethyl-N-phenyl-ureido>-ethyl)-benzenesulfonyl]-N'-butyl-urea, melting point 147–149° C., from 4-(β-<N-4-methoxyphenyl-N-methyl-ureido>-ethyl-benzenesulfonamide, melting point 150–152° C.:

N - [4-(β-<N-4-methoxyphenyl-N-methyl-ureido>-ethyl)-benzensulfonyl]-N'-cyclohexyl-urea, melting point 184–186° C.

N - [4-(β-<N-4-methoxyphenyl-N-methyl-ureido>-ethyl)-benzenesulfonyl]-N'-(4-methyl-cycolhexyl)-urea, melting point 188–190° C., from 4 - (β-<N-3-methoxyphenyl-N-methyl-ureido>-ethyl)-benzensulfonamide, melting point 194–196° C.:

N - [4-(β-<N-3-methoxyphenyl-N-methyl-ureido>-ethyl)-benzenesulfonyl] - N' - cyclohexyl-urea, melting point 137– 139° C., N - [4-(β-<N-3-methoxyphenyl-N-methyl-ureido>-ethyl)-benzenesulfonyl]-N'-(4-methyl-cyclohexyl)-urea, melting point 152–154° C., N - [4-(β-<N-3-methoxyphenyl-N-methyl-ureido>-ethyl)-benzenesulfonyl]-N'-isobutyl-urea, melting point 115–117° C., from 4-(β-<N - 2-methoxyphenyl-N-methyl-ureido>-ethyl)-benzenesulfonamide, melting point 155–157° C.:

N - [4-(β-<N-2-methoxyphenyl-N-methyl-ureido>-ethyl)-benzenesulfonyl] - N' - cyclohexyl-urea, melting point 192–194° C., N - [4-(β-<N-2-methoxyphenyl-N-methyl-ureido>-ethyl)-benzenesulfonyl]-N'-(4-methyl-cyclohexyl)-urea, melting point 178–180° C.

N - [4-(β-<N-2-methoxyphenyl-N-methyl-ureido>-ethyl)-benzenesulfonyl]-N'-isobutyl-urea, melting point 189–191° C., from 4-(β-<N - 3 - trifluoromethylphenyl - N - methyl-ureido>-ethyl)-benzenesulfonamide, melting point 176–178° C.:

N - [4-(β-<N-3-trifluoromethylphenyl-N-methyl-ureido>- ethyl)-benzenesulfonyl] - N' - cyclohexyl-urea, melting point 161–163° C.,

N - [4-(β-<N-3-trifluoromethylphenyl-N-methyl-ureido>-ethyl)-benzenesulfonyl] - N' - (4 - methyl-cyclohexyl)-urea, melting point 151–153° C., N - [4-(β-<N-3-trifluoromethylphenyl-N-methyl-ureido>-ethyl)-benzenesulfonyl]-N'-isobutyl-urea, melting point 144–146° C., from 4-(β-<N-4-isopropylphenyl-N-methyl-ureido>-ethyl)-benzenesulfonamide, melting point 173–174° C.:

N-[4-(β-<N - 4 - isopropylphenyl - N - methyl-ureido>-ethyl)-benzenesulfonyl] - N' - cyclohexyl-urea, melting point 157–159° C., N-[4-(β-<N - 4 - isopropylphenyl - N - methyl-ureido>-ethyl)-benzsensulfonyl] - N' - (4-methyl-cyclohexyl)-urea, melting point 164–166° C., N-[β-<N-4-isopropylphenyl - N - methyl-ureido>-ethyl)-benzenesulfonyl]-N-'-isobutyl-urea, melting point 150–152° C., from 4-(β-<N-5-chloro - 2 - methyl-phenyl - N - methyl-ureido>-ethyl)-benzenesulfonamide, melting point 150–152° C.:

N - [4 - (β-<N - 5 - chloro-2-methyl-phenyl-N-methyl-ureido>ethyl)-benzenesulfonyl] - N'-cyclohexyyl-urea, melting point 173–175° C.

N-[4-(β-<N-5-chloro-2-methyl-phenyl-N-methyl-ureido>-ethyl)-benzenesulfonyl]-N'-cyclohexyl-urea, melting point 173–175° C.

N-[4-(β-<N-5-chloro-2-methyl-phenyl-N-methyl-ureido>-ethyl)-benzenesulfonyl]-N'-(4-methyl-cyclohexyl-urea, melting point 170–172° C.

N-[4-(β-<N-5-chloro-2-methyl-phenyl-N-methyl-ureido>-ethyl)-benzenesulfonyl]-N'-butyl-urea, melting point 155–157° C.

from 4-(β-<N-5-chloro-2-methoxy-phenyl-N-methyl-ureido>-ethyl)-benzenesulfonamide, melting point 172–174° C.:

N-[4-(β-<N-5-chloro-2-methoxy-phenyl-N-methyl-ureido>-ethyl)-benzenesulfonyl]-N'-cyclohexyl-urea, melting point 182–184° C.

N-[4-(β-<N-5-chloro-2-methoxy-phenyl-N-methyl-ureido>-ethyl)-benzenesulfonyl[-N'-(4-methyl-cyclohexyl)-urea, melting point 147–149° C.

N-[4-(β-<N-5-chloro-2-methoxy-phenyl-N-methyl-ureido>-ethyl)-benzenesulfonyl]-N'-isobutyl-urea, melting point 150–152° C.

from 4-(β-<N-4-chloro-2-methoxy-phenyl-N-methyl-ureido>-ethyl)-benzenesulfonamide, melting point 175–177° C.:

N-[4-(β-<N-4-chloro-2-methoxy-phenyl-N-methyl-ureido>-ethyl)-benzenesulfonyl]-N'-cyclohexyl-urea, melting point 192°194° C.

N-[4-(β-<N-4-chloro-2-methoxy-phenyl-N-methyl-ureido>-ethyl)-benzenesulfonyl]-N'-(4-methyl-cyclohexyl)-urea, melting point 181–183° C.

N-[4-(β-<N-4-chloro-2-methoxy-phenyl-N-methyl-ureido>-ethyl)-benzenesulfonyl]-N'-isobutyl-urea, melting point 181–183° C.

from 4-(β-<N-3,4-dimethyl-phenyl-N-methyl-ureido>-ethyl)-benzenesulfonamide, melting point 154–156° C.:

N-[4-(β-<N-3,4-dimethyl-phenyl-N-methyl-ureido>-ethyl)-benzenesulfonyl]-N'-cyclohexyl-urea, melting point 184–186° C.

N-[4-(β-<N-3,4-dimethyl-phenyl-N-methyl-ureido>-ethyl)-benzenesulfonyl]-N'-(4-methyl-cyclohexyl)-urea, melting point 157–159° C.

N-[4-(β-<N-3,4-dimethyl-phenyl-N-methyl-ureido>-ethyl)-benzenesulfonyl]-N'-isobutyl-urea, melting point 150–152° C.

N-[4-(β-<N-3,4-dimethyl-phenyl-N-methyl-ureido>-ethyl)-benzenesulfonyl]-N'-(4-ethyl-cyclohexyl)-urea, melting point 151–153° C.

from 4-(β-<N-3-methoxy-4-methyl-phenyl-N-methyl-ureido>-ethyl)-benzenesulfonamide, melting point 176–177° C.:

N-[4-(β-<N-3-methoxy-4-methyl-phenyl-N-methyl-ureido>-ethyl)-benzenesulfonyl]-N'-cyclohexyl-urea, melting point 151–153° C.

N-[β-<N-3-methoxy-4-methyl-phenyl-N-methyl-ureido>-ethyl)-benzenesulfonyl]-N'-(4-methyl-cyclohexyl)-urea, melting point 174–176° C.

N-[4-(β-<N-3-methoxy-4-methyl-phenyl-N-methyl-ureido>-ethyl)-benzenesulfonyl]-N'-butyl-urea, melting point 160–162° C.

from 4-(β-<N-2-chloro-4-methyl-phenyl-N-methyl-ureido>-ethyl)-benzenesulfonamide, melting point 156–158° C.:

N-[4-(β-<N-2-chloro-4-methyl-phenyl-N-methyl-ureido>-ethyl)-benzenesulfonyl]-N'-cyclohexyl-urea, melting point 185–187° C.

N-[4-(β-<N-2-chloro-4-methyl-phenyl-N-methyl-ureido>-ethyl)-benzenesulfonyl]-N'-(4-methyl-cyclohexyl)-urea, melting point 168–170° C.

N-[4-(β-<N-2-chloro-4-methyl-phenyl-N-methyl-ureido>-ethyl)-benzenesulfonyl]-N'-isobutyl-urea, melting point 182–184° C.

from 4-(β-<N-ethyl-N-4-chlorophenyl-ureido>-ethyl)-benzenesulfonamide, melting point 189–192° C.:

4-[4-(β-<N-ethyl-N-4-chlorophenyl-ureido>-ethyl)-benzenesulfonyl]-N'-cyclohexyl-urea, melting point 164–166° C.

N-[4-(β-<N-ethyl-N-4-chlorophenyl-ureido>-ethyl)-benzenesulfonyl]-N'-(4-methyl-cyclohexyl)-urea, melting point 167–169° C.

N-[4-(β-<N-ethyl-N-chlorophenyl-ureido>-ethyl)-benzenesulfonyl]-N'-isobutyl-urea, melting point 164–166° C.

from 4-(β-<N-4-ethoxyphenyl-N-methyl-ureido>ethyl)-benzene-sulfonamide, melting point 176–178° C.:

N-[4-(β-<N-4-ethoxyphenyl-N-methyl-ureido>-ethyl)-benzene-sulfonyl]-N'-cyclohexyl-urea, melting point 169–171° C.

N-[4-(β-<N-4-ethoxyphenyl-N-methyl-ureido>-ethyl)-benzene-sulfonyl]-N'-(4-methyl-cyclohexyl)-urea, melting point 175–177° C.

N-[4-(β-<N-4-ethoxyphenyl-N-methyl-ureido>-ethyl)-benzene-sulfonyl]-N'-isobutyl-urea, melting point 143–145° C.

from 4-(β-<N-3-ethoxy-phenyl-N-methyl-ureido>-ethyl)-benzene-sulfonamide, melting point 177–179° C.:

N-[4-(β-<N-3-ethoxy-phenyl-N-methyl-ureido>-ethyl)-benzene-sulfonyl]-N'-cyclohexyl-urea, melting point 139–141° C.

N-[4-(β-<N-3-ethoxy-phenyl-N-methyl-ureido>-ethyl)-benzene-sulfonyl]-N'-(4-methyl-cyclohexyl)-urea, melting point 149–151° C.

N-[4-(β-<N-3-ethoxy-phenyl-N-methyl-ureido>-ethyl)-benzene-sulfonyl]-N'-butyl-urea, melting point 124–126° C.

from 4 - (β - <N - 3-chloro-4-methyl-phenyl-N-methyl-ureido>-ethyl)-benzenesulfonamide, melting point 189–192° C.:

N-[4-(β-<N-3-chloro-4-methyl-phenyl-N-methyl-ureido>-ethyl)-benzenesulfonyl]-N'-cyclohexyl-urea, melting point 188–190° C.

N-[4-(β-<N-3-chloro-4-methyl-phenyl-N-methyl-ureido>-ethyl)-benzenesulfonyl]-N'-(4-methylcyclohexyl)-urea, melting point 154–156° C.

N-[4-(β-<N-3-chloro-4-methyl-phenyl-N-methylureido>-ethyl)-benzenesulfonyl]-N'-isobutyl-urea, melting point 162–164° C.

N-[4-(β-<N-3-chloro-4-methyl-phenyl-N-methyl-ureido>-ethyl)-benzenesulfonyl]-N'-(4-ethyl-cyclohexyl)-urea, melting point 145–147° C.

from 4-(β-<N-4-bromophenyl-N-methyl-ureido>-ethyl)-benzene-sulfonamide, melting point 177–181° C.:

N-[4-(β-<N-4-bromopenyl-N-methyl-ureido>-ethyl)-benzene-sulfonyl]-N'-cyclohexyl-urea, melting point 173–175° C.

N-[4-(β-<N-4-bromopenyl-N-methyl-ureido>-ethyl)-benzene-sulfonyl]-N'-(4-methyl-cyclohexyl)-urea, melting point 189–191° C.

N-[4-(β-<N-4-bromopenyl-N-methyl-ureido>-ethyl)-benzene-sulfonyl]-N'-isobutyl-urea, melting point 156–158° C.

from 4 - (β - <N - tert. butylphenyl-N-methyl-ureido>-ethyl)-benzenesulfonamide, melting point 164–166° C.:

N-[4-(β-<N-4-tert. butylphenyl-N-methyl-ureido>-ethyl)-benzene-sulfonyl]-N'-cyclohexyl-urea, melting point 191–193° C.

from 4 - (N - methyl-N-phenyl-ureido-methyl)-benzenesulfonamide, melting point 156–158° C.:

N-[4-(N-methyl-N-phenyl-ureido-methyl)-benzenesulfonyl]-N'-(4-methyl-cyclohexyl)-urea, melting point 172–174° C.

from 4 - (β-<N-4-iodo-phenyl-N-methyl-ureido>-ethyl)-benzenesulfonamide, melting point 181–183° C.:

N-[4-(β-<N-4-iodo-phenyl-N-methyl-ureido>-ethyl)-benzene-sulfonyl]-N'-(4-methyl-cyclohexyl)-urea, melting point 194–196° C.

EXAMPLE 3

N-[4-(β-<N-4-chlorophenyl-N-methyl-ureido>-ethyl)-benzenesulfonyl]-N'-cyclohexyl-urea 10.6 g. 4 - (β-<N-4-chlorophenyl-N-methyl-ureido>-ethyl)-benzenesulfonyl-methyl - urethane (melting point 188–190° C., prepared from 4-(β-<N-4-chlorophenyl-N-methyl-ureido>-ethyl) - benzenesulfonamide and chloroformic acid methylester) are heated in an oil bath to 130° C. for 1 hour with 2.5 g. of cyclohexylamine. After cooling, the reaction product is precipitated from 1% of ammonia and recrystallized from water/ethanol. The N-[4 - (β-<N-4-chloro-phenyl-N-methyl-ureido>-ethyl)-benzenesulfonyl]-N'-cyclohexyl-urea melts at 173–175° C.

In analogous manner there is obtained: From 4-(β-<N-4-methyl-phenyl-N-methyl-ureido>-ethyl)-benzneesulfonyl-methylurethane (melting point 166–168° C.)

N-[4-(β-<N-4-methyl-phenyl-N-methyl-ureido>-ethyl)-benzenesulfonyl]-N'-cyclohexyl-urea, melting point 165–167° C.

N-[4-(β-<N-4-methyl-phenyl-N-methyl-ureido>-ethyl)-benzenesulfonyl]-N'-cycloheptyl-urea, melting point 140–142° C.

N-[4-(β-<N-4-methyl-phenyl-N-methyl-ureido>-ethyl)-benzenesulfonyl]-N'-nortricyclyl-urea, melting point 187–189° C.

N-[4-(β-<N-4-methyl-phenyl-N-methyl-ureido>-ethyl)-benzenesulfonyl]-N'-cyclopentyl-urea, melting point 156–158°C.

N-[4-(β-<N-5-chloro-2-methoxy-phenyl-N-methyl-ureido>-ethyl)-benzenesulfonyl]-N'-(3,4-dimethyl-cyclohexyl)-urea, melting point 154–156° C.

We claim:
1. A compound of the formula

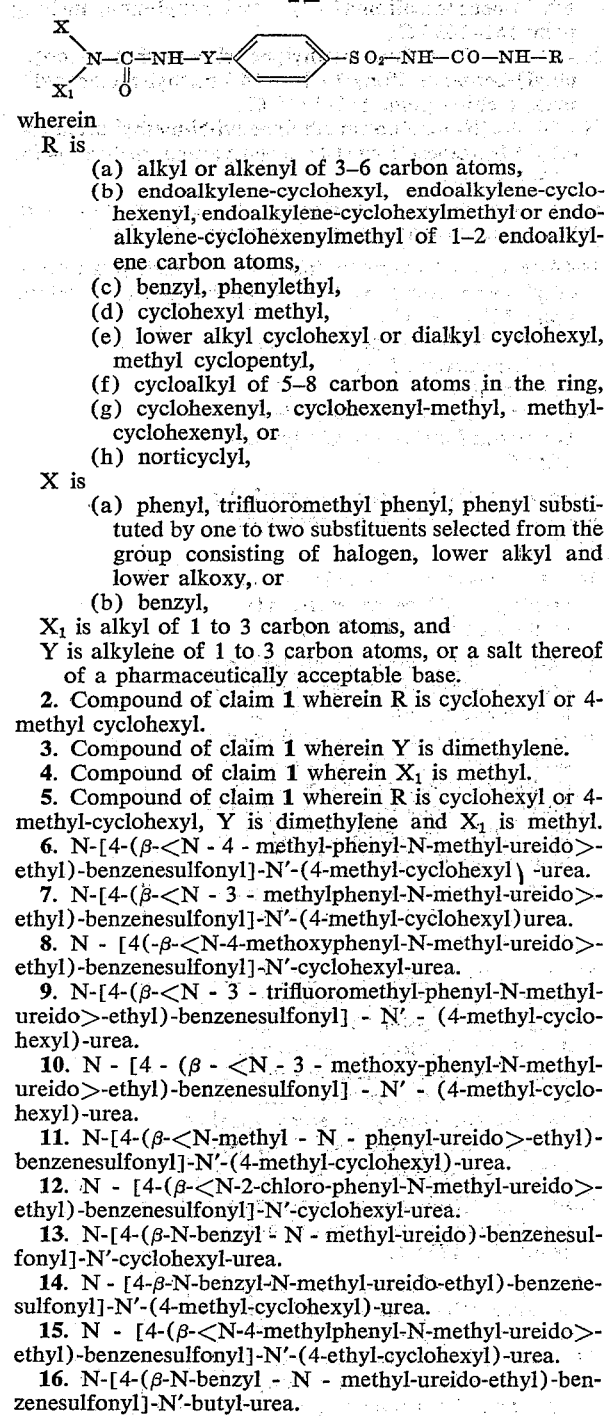

wherein
R is
(a) alkyl or alkenyl of 3–6 carbon atoms,
(b) endoalkylene-cyclohexyl, endoalkylene-cyclohexenyl, endoalkylene-cyclohexylmethyl or endoalkylene-cyclohexenylmethyl of 1–2 endoalkylene carbon atoms,
(c) benzyl, phenylethyl,
(d) cyclohexyl methyl,
(e) lower alkyl cyclohexyl or dialkyl cyclohexyl, methyl cyclopentyl,
(f) cycloalkyl of 5–8 carbon atoms in the ring,
(g) cyclohexenyl, cyclohexenyl-methyl, methyl-cyclohexenyl, or
(h) norticyclyl,
X is
(a) phenyl, trifluoromethyl phenyl, phenyl substituted by one to two substituents selected from the group consisting of halogen, lower alkyl and lower alkoxy, or
(b) benzyl,
$X_1$ is alkyl of 1 to 3 carbon atoms, and
Y is alkylene of 1 to 3 carbon atoms, or a salt thereof of a pharmaceutically acceptable base.

2. Compound of claim 1 wherein R is cyclohexyl or 4-methyl cyclohexyl.
3. Compound of claim 1 wherein Y is dimethylene.
4. Compound of claim 1 wherein $X_1$ is methyl.
5. Compound of claim 1 wherein R is cyclohexyl or 4-methyl-cyclohexyl, Y is dimethylene and $X_1$ is methyl.
6. N-[4-(β-<N - 4 - methyl-phenyl-N-methyl-ureido>-ethyl)-benzenesulfonyl]-N'-(4-methyl-cyclohexyl)-urea.
7. N-[4-(β-<N - 3 - methylphenyl-N-methyl-ureido>-ethyl)-benzenesulfonyl]-N'-(4-methyl-cyclohexyl)urea.
8. N - [4(-β-<N-4-methoxyphenyl-N-methyl-ureido>-ethyl)-benzenesulfonyl]-N'-cyclohexyl-urea.
9. N-[4-(β-<N - 3 - trifluoromethyl-phenyl-N-methyl-ureido>-ethyl)-benzenesulfonyl] - N' - (4-methyl-cyclohexyl)-urea.
10. N - [4 - (β - <N - 3 - methoxy-phenyl-N-methyl-ureido>-ethyl)-benzenesulfonyl] - N' - (4-methyl-cyclohexyl)-urea.
11. N-[4-(β-<N-methyl - N - phenyl-ureido>-ethyl)-benzenesulfonyl]-N'-(4-methyl-cyclohexyl)-urea.
12. N - [4-(β-<N-2-chloro-phenyl-N-methyl-ureido>-ethyl)-benzenesulfonyl]-N'-cyclohexyl-urea.
13. N-[4-(β-N-benzyl - N - methyl-ureido)-benzenesulfonyl]-N'-cyclohexyl-urea.
14. N - [4-β-N-benzyl-N-methyl-ureido-ethyl)-benzenesulfonyl]-N'-(4-methyl-cyclohexyl)-urea.
15. N - [4-(β-<N-4-methylphenyl-N-methyl-ureido>-ethyl)-benzenesulfonyl]-N'-(4-ethyl-cyclohexyl)-urea.
16. N-[4-(β-N-benzyl - N - methyl-ureido-ethyl)-benzenesulfonyl]-N'-butyl-urea.

References Cited
UNITED STATES PATENTS
3,448,149   6/1969   Aumuller et al. _____ 260—553

LEON ZITVER, Primary Examiner
G. A. SCHWARTZ, Assistant Examiner

U.S. Cl. X.R.
260—287 R, 326.12 R, 340.5, 999

UNITED STATES PATENT OFFICE
CERTIFICATE OF CORRECTION

Patent No. 3,655,756          Dated  April 11, 1972

Inventor(s) Helmut Weber, Rudi Weyer and Walter Aumuller

It is certified that error appears in the above-identified patent and that said Letters Patent are hereby corrected as shown below:

In the Heading:

After "F 44,630" insert --and

May 14, 1966, Germany, F 49,207--.

Signed and sealed this 29th day of August 1972.

(SEAL)
Attest:

EDWARD M. FLETCHER, JR.                ROBERT GOTTSCHALK
Attesting Officer                      Commissioner of Patents